US006778246B2

(12) United States Patent
Sun et al.

(10) Patent No.: US 6,778,246 B2
(45) Date of Patent: Aug. 17, 2004

(54) LIQUID CRYSTAL ADAPTIVE LENS WITH CLOSED-LOOP ELECTRODES AND RELATED FABRICATION METHODS AND CONTROL METHODS

(75) Inventors: Yi Sun, Huntsville, AL (US); Stephen T. Kowel, Cincinnati, OH (US); Gregory P. Nordin, Huntsville, AL (US)

(73) Assignee: University of Alabama in Huntsville, Huntsville, AL (US)

( * ) Notice: Subject to any disclaimer, the term of this patent is extended or adjusted under 35 U.S.C. 154(b) by 36 days.

(21) Appl. No.: 10/053,940

(22) Filed: Jan. 22, 2002

(65) Prior Publication Data

US 2002/0145701 A1 Oct. 10, 2002

Related U.S. Application Data

(60) Provisional application No. 60/264,636, filed on Jan. 26, 2001.

(51) Int. Cl.[7] ............................................. G02F 1/1343
(52) U.S. Cl. ....................................... 349/146; 349/200
(58) Field of Search ................................ 349/146, 200, 349/39, 142; 359/290, 291

(56) References Cited

U.S. PATENT DOCUMENTS

| 4,313,633 A | * | 2/1982 | Muntjanoff et al. ............ 294/88 |
| 4,333,720 A | * | 6/1982 | Suzuki et al. ................. 396/506 |
| 4,572,616 A | * | 2/1986 | Kowel et al. ................. 349/200 |
| 5,414,547 A | * | 5/1995 | Matsuo et al. ................. 349/44 |
| 6,191,881 B1 | * | 2/2001 | Tajima ........................ 359/254 |
| 6,388,809 B1 | * | 5/2002 | MacAulay .................... 359/383 |
| 6,480,285 B1 | * | 11/2002 | Hill ............................. 356/492 |
| 6,549,730 B1 | * | 4/2003 | Hamada ....................... 396/111 |

FOREIGN PATENT DOCUMENTS

JP                   05100201 A * 4/1993 ............. G02F/1/13

OTHER PUBLICATIONS

G. Williams, N.J. Powell, A. Purvis, M.G. Clark; *Electrically controllable liquid crystal Fresnel lens; Current Developments in Optical Engineering and Commerical Optics*; 1989; pp. 352–357; vol. 1168; SPIE Proceedings; Bellingham, Washington.

N.A. Riza, Michael C. Dejule; *Three–terminal adaptive nematic liquid crystal lens device; Optics Letters*; 1994; pp. 1013–1015; vol. 19, No. 14; Optical Society of America; Washington, DC.

Y. Takaki; *Electro–optical implementation of learning architecture to control point spread function of liquid crystal active lens; Optical Implementation of Information Processing*; 1995; pp. 205–214; vol. 2565; SPIE Proceedings; Bellingham, Washington.

(List continued on next page.)

Primary Examiner—Robert H. Kim
Assistant Examiner—David Chung
(74) Attorney, Agent, or Firm—Alston & Bird LLP

(57) ABSTRACT

A liquid crystal adaptive lens (LCAL) includes a reference plate, a liquid crystal layer disposed in electrical communication with the reference plate, and a plurality of closed-loop electrodes disposed in electrical communication with the liquid crystal layer. The closed-loop electrodes are adapted to receive a variable control voltage such that the refractive index of at least a portion of the liquid crystal layer is adjustable such that light passing through the liquid crystal layer is capable of being redirected. By including closed-loop electrodes, the liquid crystal layer of the LCAL is capable of having a radially varying refractive index.

21 Claims, 11 Drawing Sheets

OTHER PUBLICATIONS

Y. Takaki, H. Ohzu; *Liquid crystal active lens: a reconfigurable lens employing a phase modulator; Optics Communications*; 1996; pp. 123–134; vol. 126; Elsevier Science BV.

S. Masuda, S. Takahashi, T. Nose, S. Sato, H. Ito; *Liquid-crystal microlens with a beam-steering function; Applied Optics*; 1997; pp. 4772–4778; vol. 36, No. 20; Optical Society of America; Washington, DC.

Wing W. Chan, Stephen T. Kowel; *Imaging performance of liquid-crystal adaptive lens with conductive ladder meshing; Applied Optics*; 1997; pp. 8958–8969; vol. 36, No. 34; Optical Society of America; Washington, DC.

F. Naumov, M.Y. Loktev, I.R. Guralnik, G. Vdovin; *Liquid crystal adaptive lenses with mordal control; Optics Letters*; 1998; pp. 992–994; vol. 23, No. 13; Optical Society of America; Washington, DC.

Yi Sun, Stephen T. Kowel, Gregory P. Nordin; *Circular geometry liquid Crystal Adaptive Lens with Fresnel lens phase profile; Liquid Crystal Materials, Devices, and Flat Panel Displays*; 2000; pp. 120–131; vol. 3955; SPIE Proceedings; Bellingham, Washington.

Yi Sun, *Liquid Crystal Adaptive Lens with Circular Electrodes*; PH.D. Dissertation; 2002; 178 pages, University of Alabama in Huntsville.

* cited by examiner

LIQUID CRYSTAL ADAPTIVE LENS WITH CLOSED-LOOP ELECTRODES AND RELATED FABRICATION METHODS AND CONTROL METHODS

CROSS-REFERENCE TO RELATED APPLICATIONS

The present application claims priority from U.S. Provisional Patent Application Ser. No. 60/264,636, entitled: *Liquid Crystal Adaptive Lens with Circular Electrodes and Related Fabrication Methods and Control Methods* filed on Jan. 26, 2001, the contents of which are incorporated herein by reference.

FEDERALLY SPONSORED RESEARCH OR DEVELOPMENT

The United States Government may have rights in this invention as provided for by the terms of Contract Numbers EPS-9720653 and ECS-9625040 on behalf of the National Science Foundation.

FIELD OF THE INVENTION

The present invention relates generally to optical lenses and, more particularly, to liquid crystal switchable lenses with electrically adjustable focal lengths, and related fabrication and control methods.

BACKGROUND OF THE INVENTION

In many applications, such as imaging systems, display systems, optical memory systems and optical communication systems, it is desirable for the focal length of the lens system to be adjustable. In conventional lens systems, the lenses are designed to focus light by varying the thickness of a uniform refractive index medium over an aperture. The phase delay is generally graded in a parabolic shape across the aperture. Currently, adjustment of such conventional lenses are made in most systems by mechanical movement, with the lenses having static indices of refraction. This mechanical movement, however, is usually bulky, slow and expensive. Additionally, in high-power microscope systems the working distance is very short, which makes it easy to damage expensive lenses and samples being viewed when trying to mechanically adjust the focal length of the lens.

To remedy the problems associated with mechanically adjustable optics, liquid crystal (LC) switchable lenses with electrically adjustable focal lengths have been developed to provide adaptive optics, which directs light in real time without mechanical motion of bulky optics. For example, LC switchable lenses, such as micro-lenses, LC active lenses and LC modal lenses, are electro-optical devices that utilize a refractive index graded over the aperture of the lens to bring light into focus. In this regard, micro-lenses use a pair of hole-patterned electrodes to grade the refractive index over the aperture. LC active lenses connect a lens with a two-dimensional liquid crystal phase modulator with an electrode matrix. And LC modal lenses are driven by an AC voltage applied to the cell boundary. Generally, LC lenses have several advantages over mechanically adjustable optics, such as light weight, fast speed, simple control, low power consumption, high reliability, low cost and the ability to simulate different lens configurations, such as spherical and cylindrical lenses as well as Fresnel lenses, for example.

One type of LC switchable lens uses two tandem cells with orthogonal linear electrodes to control the refractive index of the lens. In these lenses, the surface of the lens is treated so that the liquid crystal molecules align homogeneously in either the "x" or "y" direction. If the preferred direction is in the "x" direction, only light polarized in the "x" direction will be affected, and visa versa. A single lens of this type of configuration, however, can only emulate a cylindrical lens. And due to the polarization sensitivity of the lens, to obtain a true spherical lens that can focus random plane polarized light, four cells of this configuration are required instead of two. Thus, to simulate spherical lenses, these type of LC lenses require two cells for each linear polarization. Additionally, because cells are never identical, two cells cannot be driven with the same voltages, which further complicates the operation of these lenses.

SUMMARY OF THE INVENTION

In light of the foregoing background, the present invention provides a liquid crystal adaptive lens (LCAL) with closed-loop electrodes and related fabrication methods and control methods. The closed-loop shape of the electrodes enables the electrodes to provide radial variation in the refractive index of the LCAL. Thus, the LCAL is capable of focusing linearly polarized light with just one cell. Additionally, because one cell can focus linearly polarized light, a single controller can drive the cell with one set of control voltages.

According to one aspect of the present invention, a liquid crystal adaptive lens (LCAL) comprises a reference plate, a liquid crystal layer disposed in electrical communication with the reference plate, and a plurality of closed-loop electrodes disposed in electrical communication with the liquid crystal layer. The closed-loop electrodes are adapted to receive a variable control voltage such that the refractive index of at least a portion of the liquid crystal layer is adjustable such that light passing through the liquid crystal layer is capable of having its phase modulated across the aperture of the liquid crystal layer.

To provide radial variation in the refractive index across at least a portion of the liquid crystal layer the closed-loop electrodes can be disposed in a concentric circular pattern. And to provide the variable control voltage to the closed-loop electrodes, the LCAL can further include at least one pair of conductors in electrical contact with at least two closed-loop electrodes, and at least one connector electrically connecting at least two closed-loop electrodes and each conductor of a respective pair of conductors. The closed-loop electrodes can also be evenly spaced from one another such that a voltage drop between each adjacent closed-loop electrode is equal when the variable control voltage is applied across the pairs of conductors. Additionally, the pairs of conductors can have a resistivity less than a resistivity of a respective connector.

In one embodiment, the closed-loop electrodes comprise at least one subset of closed-loop electrodes. In this embodiment, each pair of conductors are in electrical contact with a respective subset of closed-loop electrodes, and each connector electrically connects each closed-loop electrode of a respective subset of closed-loop electrodes and each conductor of the respective pair of conductors. As such, the LCAL can emulate a Fresnel phase profile with each subset of closed-loop electrodes comprising a Fresnel zone. In this regard, to reduce overall aberration, a phase delay in each Fresnel zone can be equal.

According to another aspect of the present invention, a method of fabricating a liquid crystal adaptive lens comprises begins by forming the pairs of conductors upon a substrate, and thereafter depositing an insulating layer upon the pairs of conductors and the substrate. Next, the closed-loop electrodes are created on the insulating layer such that at least one closed-loop electrode is in electrical contact with each conductor. For example, the closed-loop electrodes can be created by depositing a layer of electrically conductive material upon the insulating layer and thereafter forming the layer of electrically conductive material into the plurality of closed-loop electrodes. In a further embodiment, creating the closed-loop electrodes can include forming at least one connector between at least two closed-loop electrodes. After the closed-loop electrodes are created, a layer of liquid crystal is then deposited upon the plurality of closed-loop electrodes, and the reference plate is secured upon the layer of liquid crystal.

In another embodiment, the closed-loop electrodes are created by forming at least one pair of electrically conductive vias within the insulating layer such that the vias are in electrical contact with a respective pair of conductors. And then the closed-loop electrodes are produced such that at least one closed-loop electrode electrically contacts each via. In this regard, the electrically conductive vias can be formed by first forming an etch mask defining at least one opening upon the insulating layer. Then, at least one hole is etched within the openings, with the holes extending through the insulating layer such that at least a portion of the at least one pair of conductors is exposed. Finally, an electrically conductive material is deposited within the holes such that the electrically conductive material electrically contacts the pairs of conductors.

The present invention also provides an LCAL system that comprises an LCAL, such as that described above, and an auto-focusing subsystem capable of adjusting the variable control voltage to the LCAL to thereby adjust a refractive index of at least a portion of the liquid crystal layer of the LCAL such that light passing through the liquid crystal layer is capable of being redirected. In this regard, the auto-focusing subsystem can include an image source capable of passing light through the LCAL, and an image capture device capable of capturing the light after the light passes through the liquid crystal layer of the LCAL. Further, the auto-focusing subsystem can include a control element capable of adjusting the variable control voltage to at least one subset of the closed-loop electrodes of the LCAL to thereby adjust the refractive index of at least a portion of the liquid crystal layer of the LCAL. In this regard, the control element is capable of adjusting the variable control voltage at least partially based upon a point spread function of the light captured by the image capture device. For example, the control element can apply the variable control voltage to the conductors of the LCAL.

In one embodiment, the control element is capable of applying a set of control voltages to the LCAL and thereafter calculating the point spread function for the light captured by the image capture device at each control voltage. In this embodiment, the control element is capable of adjusting the variable control voltage based on a comparison of the point spread function for the light captured at each control voltage in the set. In embodiments where the closed-loop electrodes comprise at least one subset of closed-loop electrodes, the control element is capable of applying a set of control voltages to each subset of closed-loop electrodes, and thereafter calculating the point spread function for the light captured by the image capture device at each voltage within each set of voltages applied to each subset of closed-loop electrodes. As such, the control element can compare the point spread function for the light captured at each voltage, and adjust the variable control voltage to the closed-loop electrodes based upon the comparison of the point spread function for the light captured at each control voltage of each set of voltages applied to each subset of closed-loop electrodes.

In another embodiment, the LCAL system further includes a lens capable of directing the light in a predetermined direction before the light passes through the LCAL. Also, the LCAL system can include a polarizer capable of polarizing the light in a predefined orientation after the lens directs the light and before the light passes through the LCAL.

In operation, a variable control voltage is applied to a subset of the closed-loop electrodes of the LCAL. Light is then passed through the liquid crystal layer of the LCAL and thereafter captured. A point spread function for the light captured is calculated, and the variable control voltage is adjusted at least partially based upon the point spread function to thereby adjust a refractive index of at least a portion of the liquid crystal layer such that the light passing through the liquid crystal layer is redirected. In embodiments including the lens and polarizer, the light is directed in a predetermined direction before passing the light through the LCAL. Then, the light is polarized in a predefined orientation.

In another embodiment, a series of control voltages are applied to the subset of the closed-loop electrodes. As such, the light is captured after passing through the LCAL at each control voltage, and the point spread function is calculated for the light captured at each control voltage. In this embodiment, the point spread functions for the light captured at each control voltage are compared before adjusting the variable control voltage, with the variable control voltage adjusted based upon the comparison. Further, in one embodiment, the light is passed and captured, and the point spread functions are calculated and compared repeatedly for each subset of the plurality of closed-loop electrodes before adjusting the variable control voltage.

Therefore, the LCAL with closed-loop electrodes of the present invention can produce radial variation in the refractive index of the liquid crystal layer of the LCAL. Thus, the LCAL is capable of focusing linearly polarized light with just one cell, with a single controller driving the cell with one set of control voltages for each focal length desired.

BRIEF DESCRIPTION OF THE DRAWINGS

Figure 1:
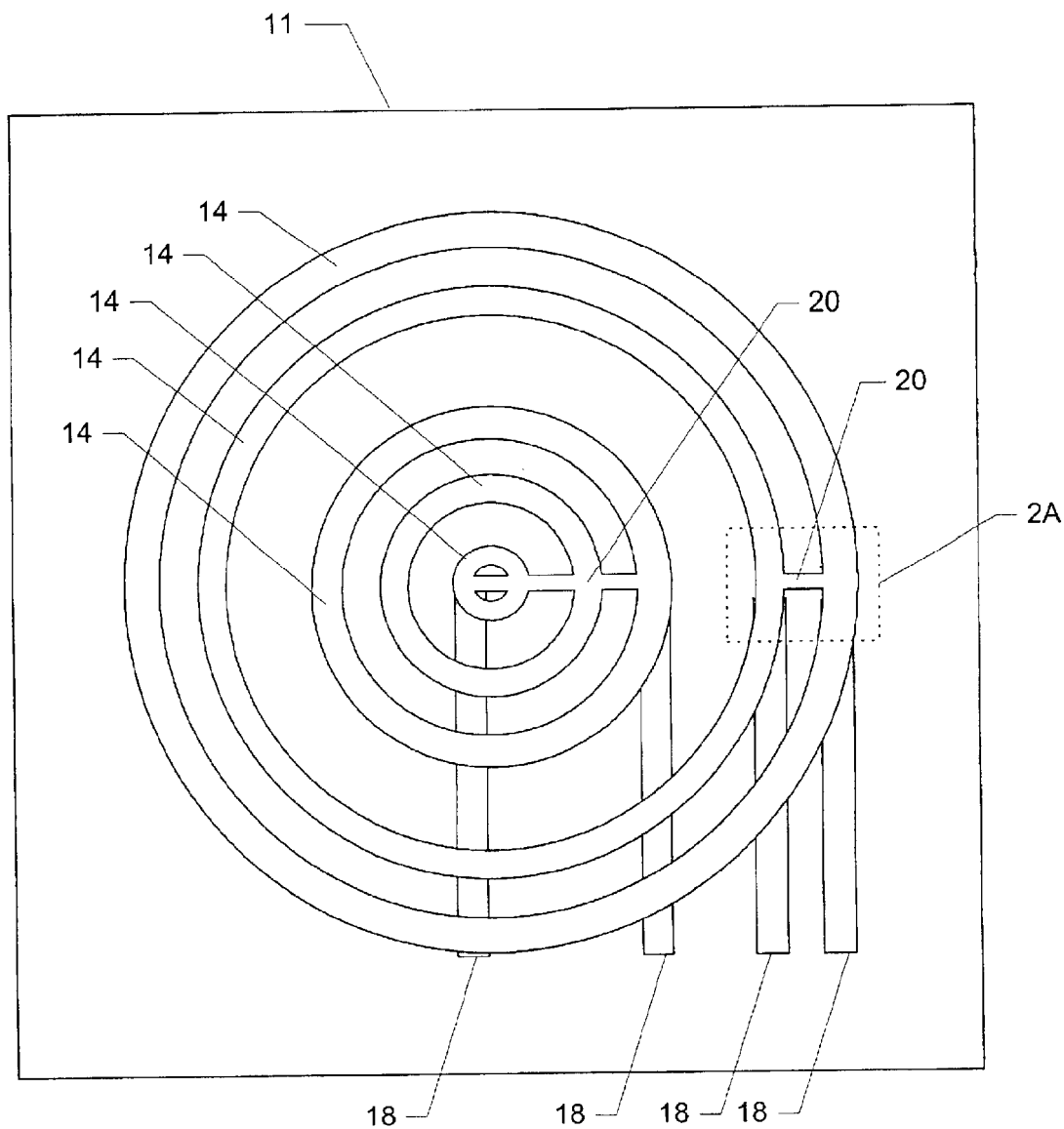
Figure 2A:
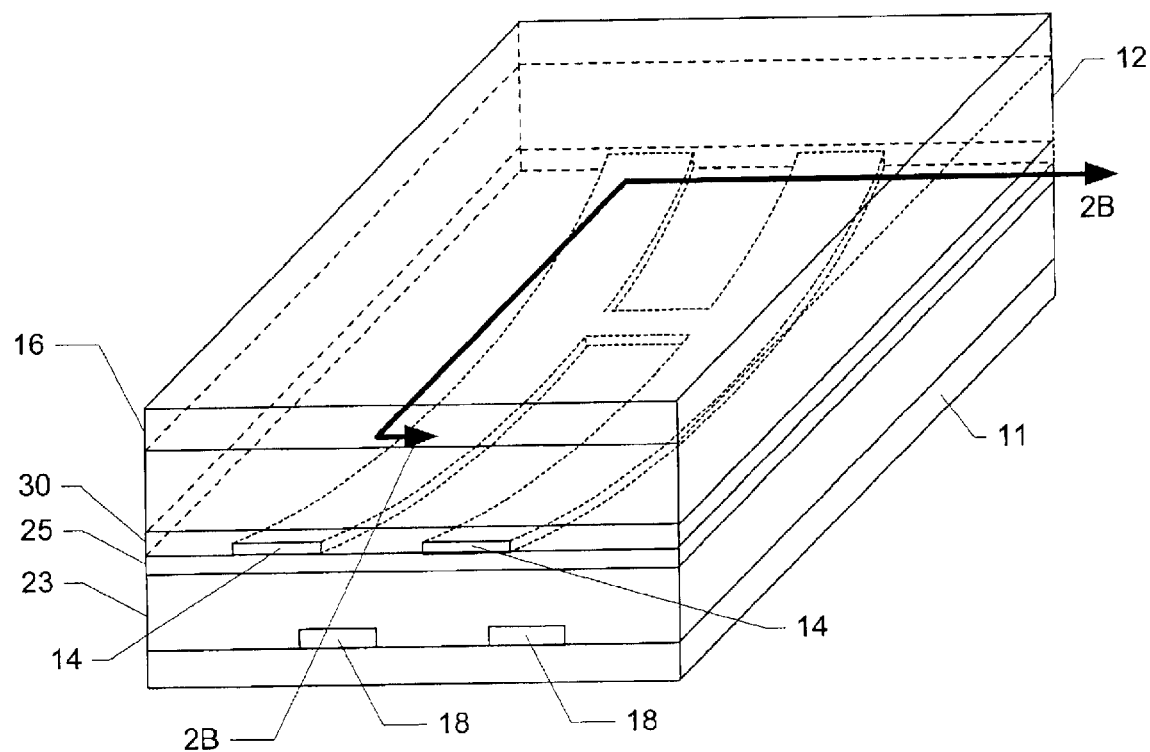
Figure 2B:
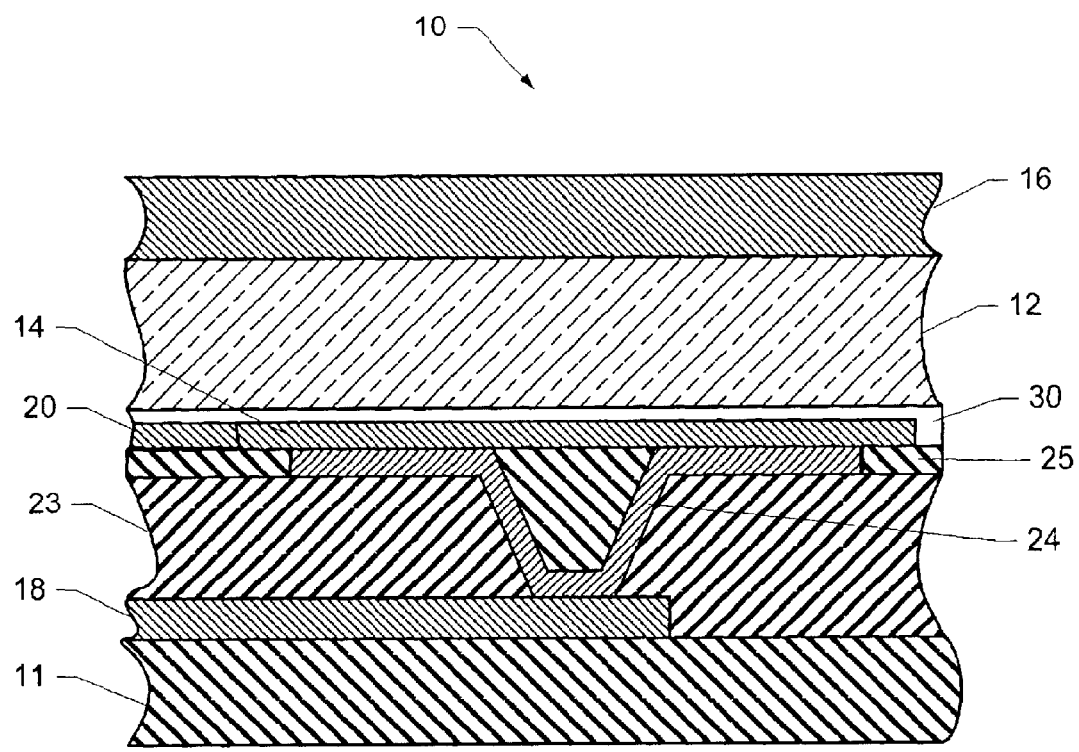
Figure 4:
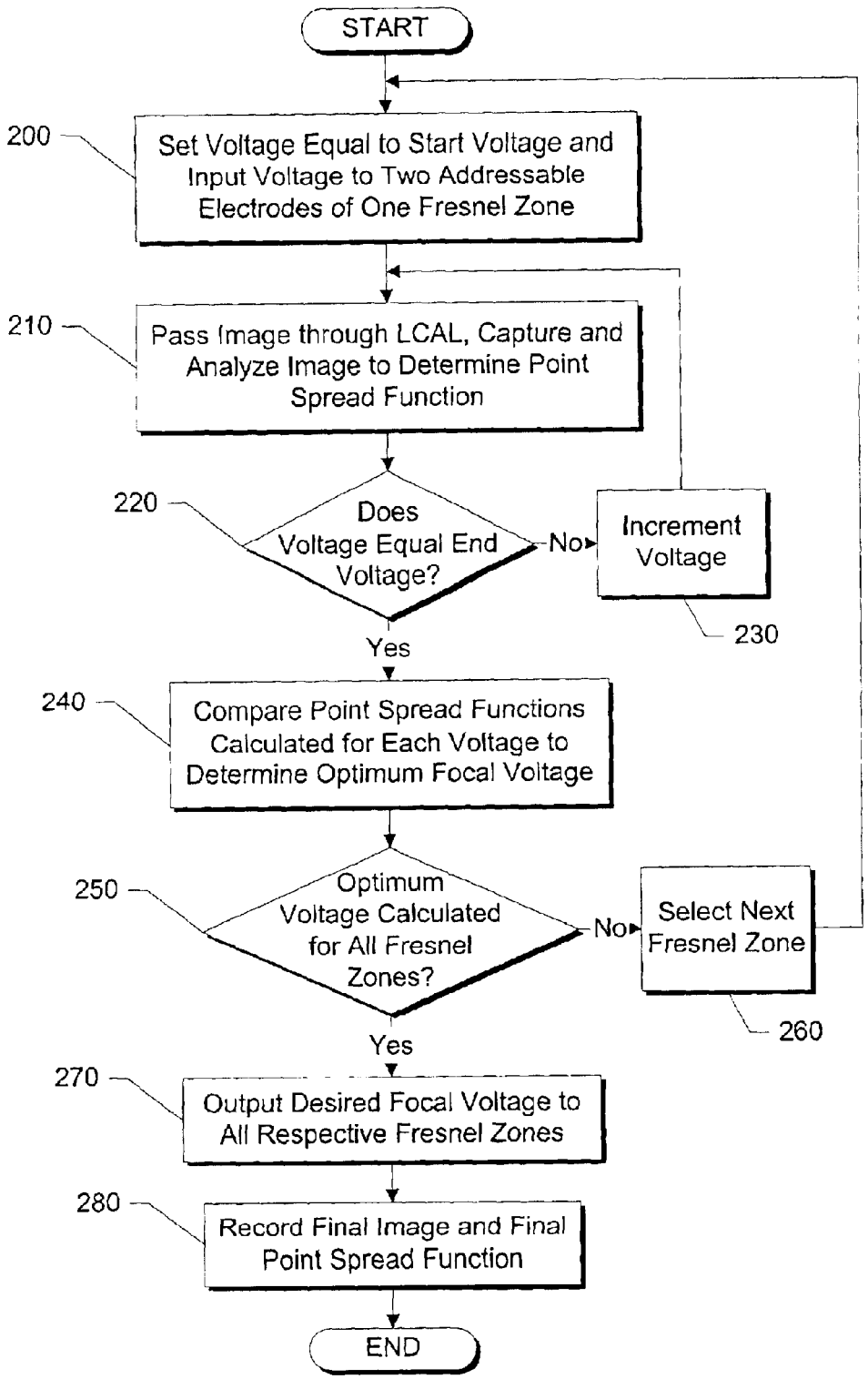
Figure 5:
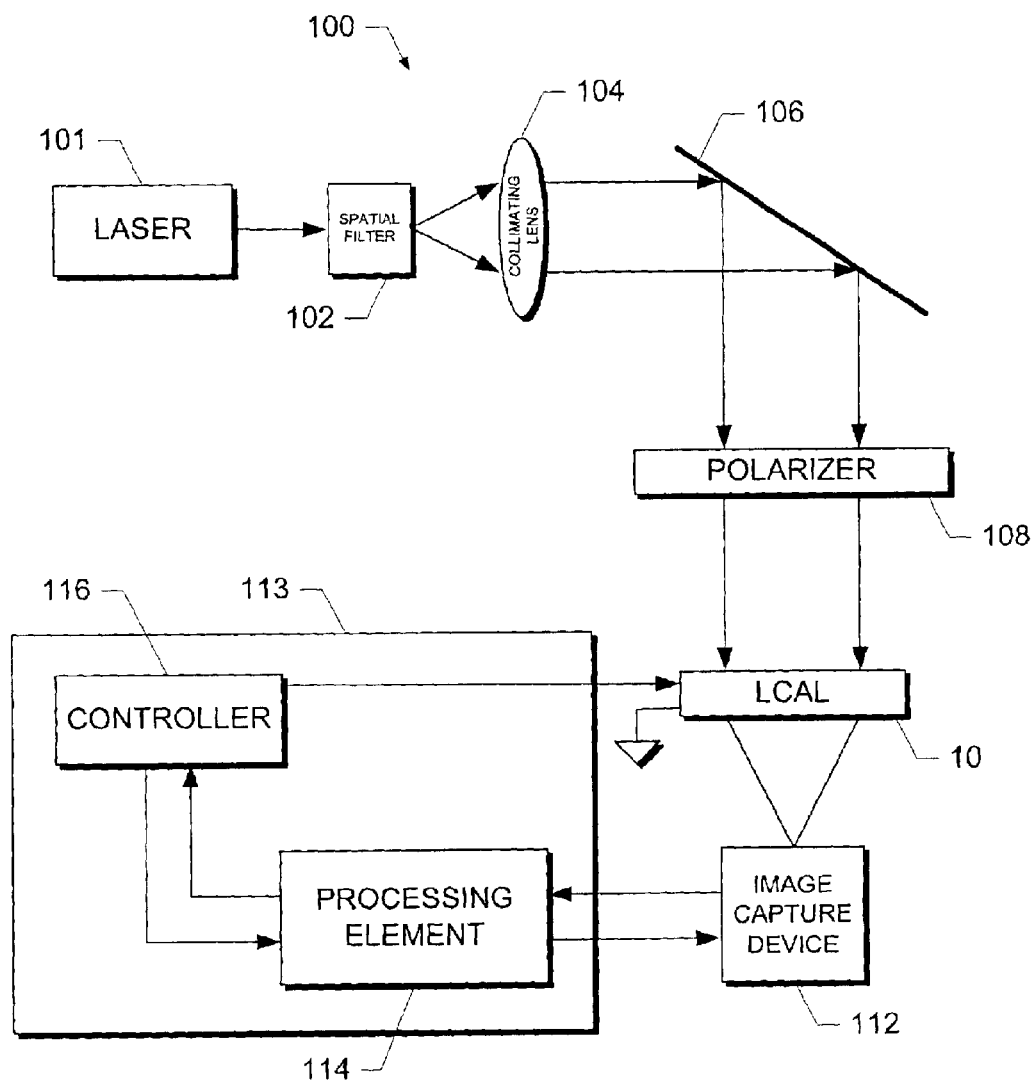
Figure 6:
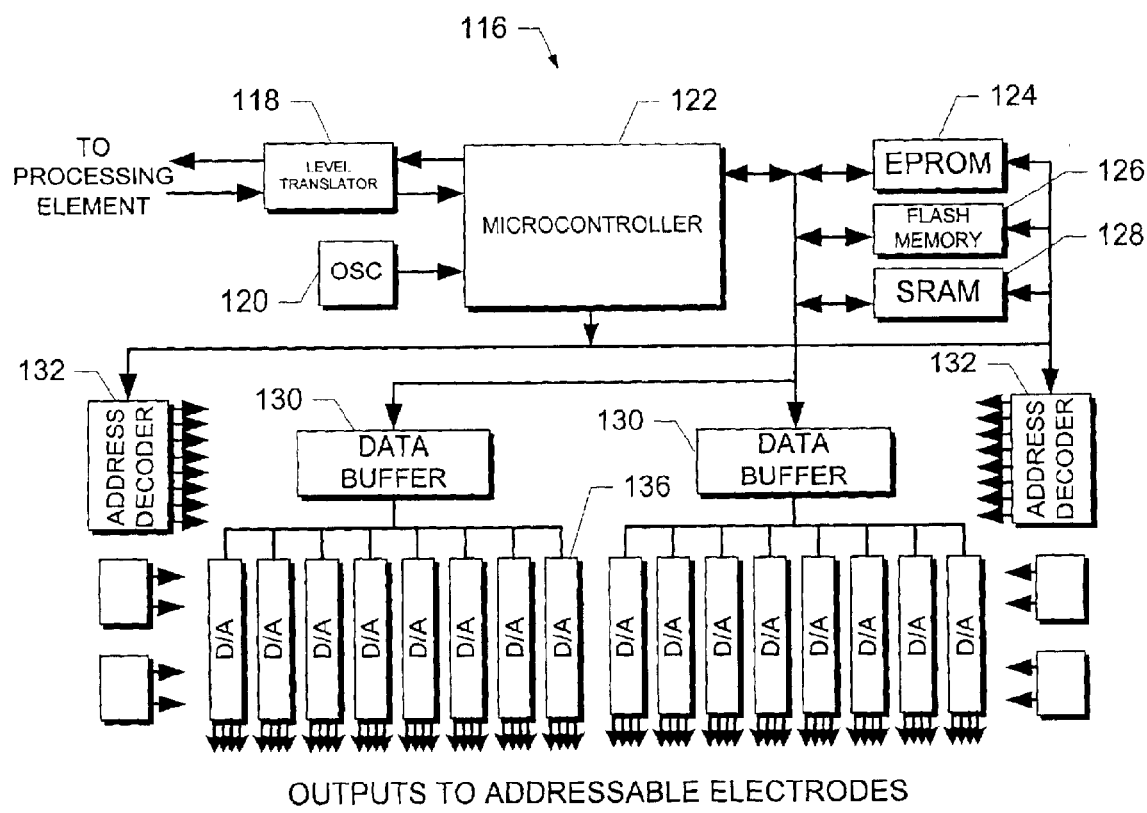

Having thus described the invention in general terms, reference will now be made to the accompanying drawings, which are not necessarily drawn to scale, and wherein:

FIG. 1 is a top view of the LC adaptive lens (LCAL) of the present invention with the liquid crystal and reference plate layers removed for purposes of illustration and looking into the insulating layers, according to one embodiment;

FIG. 2A is a perspective view of a section of the LCAL illustrated in FIG. 1 and including the liquid crystal and reference plate layers, taken from section 2A;

FIG. 2B is a cross-section view of the section of the LCAL illustrated in FIG. 2A, taken along line 2B;

FIGS. 3A–3J are perspective views illustrating steps in the fabrication of the LCAL, with only the section illustrated in FIG. 2A shown;

FIG. 4 is a flow diagram of the auto-focusing system of the present invention, according to one embodiment;

FIG. 5 is a block diagram of an auto-focusing system according to one embodiment employing the flow diagram illustrated in FIG. 4; and FIG. 6 is a representative block diagram of one embodiment of the controller illustrated in FIG. 4

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIGS. 1, 2A and 2B, the liquid crystal (LC) adaptive lens (LCAL) 10 of the present invention is a multi-layer composite device supported by a substrate layer 11, such as a glass substrate. The LCAL includes a reference plate 16, a nematic liquid crystal layer 12 deposited in electrical communication with the reference plate, and a plurality of closed-loop electrodes 14 deposited in electrical communication with the liquid crystal layer. The closed-loop electrodes 14 are constructed of a conducting material, such as indium tin oxide (ITO) coated glass. The electrodes can have any of a number of closed-loop shapes but, in a preferred embodiment, the electrodes are circular shaped and disposed in a concentric pattern. While the size of each electrode and separation between electrodes can vary, in one embodiment the electrodes are 10 micrometers wide, and 10 micrometers apart on a 20 micrometer center. Each electrode on the electrode plate is adapted to receive a variable control voltage such that the refractive index across the aperture of the liquid crystal layer and, thus, the LCAL, can be graded such that light passing through the LCAL is capable of being redirected, such as by being brought into focus.

As stated above, an LC switchable lens utilizing two tandem cells with orthogonal linear electrodes has disadvantages in that more cells are required to simulate a true spherical lens, and that having more cells complicates the operation of the lens because two cells cannot be driven with the same voltages. The LCAL of the present invention remedies this problem by providing a number of closed-loop electrodes, preferably arranged in a circular concentric pattern. By having electrodes in a closed-loop shape, particularly a circular shape, the electrodes can provide radial variation in the refractive index of the LCAL. Thus, the LCAL will be able to focus linearly polarized light with just one cell driven by a single controller.

In order to apply a voltage across the electrodes, the LCAL 10 includes a set of highly conductive conductors 18, connected to respective closed-loop electrodes and electrically interconnected by highly conductive connectors 20. The connectors not only connect the conductors, but also are generally connected to one or more additional closed-loop electrodes that are disposed between the closed-loop electrodes to which the conductors are connected. While the conductors and connectors can vary in width depending upon the application, in one embodiment the conducting and connectors have a width of 10 micrometers.

Because of the conductivity of the conductors 18 and connectors 20, they must be separated in the LCAL by an insulating layer, including a base insulating layer 23 and a planarizing insulating layer 25 in one embodiment. Although the insulating layers are not shown in FIG. 1 so that the relative position of the conductors to the closed-loop electrodes 14 and connectors can be highlighted, it should be understood that FIG. 1 is for illustrative purposes only and should not be seen as an actual representation of the LCAL. While the insulating layers can be formed from a variety of different insulating materials, in one embodiment the insulating layers are formed of SU-8. In order improve the performance of the LCAL, the molecules of the liquid crystal layer 12 should not be affected by the electromagnetic field of the conductors. Therefore, while the insulating layers can have any of a number of thicknesses, the thickness should be selected as large as possible while taking into account the desired performance of the LCAL and the fabrication process, since larger thicknesses are generally more difficult to fabricate. To electrically interconnect the conductors with the connectors, the LCAL includes electrical vias 24 or other electrical connections within the insulating layer between respective conductors and connectors.

As known to those skilled in the art, many conventional lenses suffer from phase aberration, which results in blurring and loss of clearness in the images produced by the lenses. There are generally two sets of phase aberrations, static phase aberration and dynamic phase aberration. Dynamic phase aberration results from inaccurate applied voltages that can be adjusted during operation. Generally, static phase aberration can be characterized as either quantization aberration and meshing aberration. In this regard, quantization aberration is the result of sampling the refractive index of the lens by discrete electrodes, while meshing aberration results from the difference in refractive indices between the electrode region and the interstitial region (region between electrodes). The refractive index distortion in the interstitial region creates the meshing phase aberration, which causes a "lenslet" effect. And when Fresnel lenses are simulated with conventional LC switchable lenses, the lenslet effect generally causes discontinuity at the boundary of each Fresnel zone, thus introducing aberration.

To reduce static phase aberration in the LCAL 10, the conductors 18, closed-loop electrodes 14 and connectors 20 form a "conductive ladder meshing" design. The conductive ladder meshing design divides the LCAL into sections such that each section includes a subset of electrodes, including a plurality of closed-loop electrodes, two addressable conductors connected to two of the closed-loop electrodes (typically the two outermost closed-loop electrodes of the subset) and a connector extending between the two conductors and connected to each of the other closed-loop electrodes, i.e., any intermediate closed-loop electrodes of the subset. Upon applying a variable control voltage across the two conductors, the voltage drop along the connector will be linear, and the voltage drop between each pair of adjacent closed-loop electrodes will be equal since the closed-loop electrodes are evenly spaced. The voltage drop between the closed-loop electrodes will be produced and controlled by a voltage drop along the connector. In this regard, the voltage drop along the conductor is preferably small enough so that the applied voltage can be in the desired operation range. The voltage drop can be controlled by the ratio of the resistivity of the conductor and the resistivity of the connector. In order to decrease the voltage drop, the resistivity of the conductors is preferably low (such as 5Ω-square) compared to the resistivity of the connectors (such as 500Ω-square), preferably at a ratio of less than 0.4.

The conductive ladder meshing design gives the LCAL a property known as "sloppy staircase" phase delay between the two addressable conductors. The conductive ladder meshing design also allows a Fresnel phase profile to be emulated with the LCAL 10, with each section made up of a subset of closed-loop electrodes 14 electrically connected by a connector 20 so as to act as a Fresnel zone, with two Fresnel zones shown in FIG. 1. While FIGS. 1 and 2 only depict Fresnel zones comprising two and three closed-loop electrodes and two conductors, it should be understood that the Fresnel zones typically comprise a greater number of electrodes and conductors, and the figures are for illustrative purposes only. As stated, the number of electrodes in the LCAL and the number of electrodes in each Fresnel zone can vary. For example, in one embodiment, the LCAL includes 196 closed-loop electrodes divided into 32 Fresnel zones, with 32 connectors 20 (one per Fresnel zone) and 64 conductors 18 (two addressable conductors per Fresnel zone).

To reduce the overall aberration, the LCAL 10 employs an equal phase spacing design wherein the phase delay in each Fresnel zone is equal. For a nominal "design" focal length, the phase delay in each Fresnel zone is $2\pi$. For example, at any given time, an AC voltage at a conductor connected at one end of a respective connector will have a phase that differs by $2\pi$ from the AC voltage at the conductor connected at the other end of the respective connector. When the focal length is changed, the phase delay in each Fresnel zone will be equal, but not exactly $2\pi$. The equal phase spacing design minimizes overall aberration, optimizes the coherent transfer function (CTF), and maximizes the variable focal length range. While the focal length varies, the nominal designed focal length for one advantageous LCAL is 0.38 meters.

For the steady-state, assuming that the refractive index under the closed-loop electrodes 14 is uniform while in the interstitial region (region between closed-loop electrodes), the refractive index is parabolic in shape because of electrostatic field meshing. Because of the closed-loop geometry of the electrodes, the LCAL 10 can be considered as an ideal thin lens with aberration. Ignoring the constant phase term, the transmittance of the LCAL for a given radius of the aperture of the liquid crystal layer 12, r, is:

$$T_{LCAL}(r) = \exp\left(\frac{j*k*r^2}{2*f}\right) * \exp(-j*\Phi_{LCAL}) * cir(r/r_0) \quad (1)$$

In equation (1), $T_{LCAL}$ is the transmittance of the LCAL, f is the focal length, $r_0$ is the maximum radius of the aperture, $\Phi_{LCAL}$ is the phase aberration, and cir is the circular aperture function. The imaging of light passing through the LCAL can be characterized in terms of its coherent transfer function and impulse response (i.e., point spread function). Now, assume a complex pupil function as follows:

$$P_{LCAL}(r) = \exp(-j* \Phi_{LCAL}) * cir(r/r_0) \quad (2)$$

The impulse response, h, of light passing through the LCAL can be represented as follows:

$$h(r) = \int_{-\infty}^{\infty}\int_0^{2\pi} r * P_{LCAL}(r) * \exp[j*(k_r*r*\cos(\vartheta - \varphi)]dr d\vartheta \quad (3)$$

In equation (3), $k_r=k*r/f$ The Fourier transform of h(r) is the coherent transfer function (CTF) of the light. Therefore, the intensity of the light on the focal plane can be represented as:

$$I_f = |h(r)|^2 \quad (4)$$

Using equation (4), the focal plane intensity of the LCAL can be predicted. The variation of the refractive index n across the aperture of the liquid crystal layer LCAL can be expressed as follows:

$$n = n_e - [(n_e - n_i)* r_0^2]* r^2 \quad (5)$$

In equation (5), $n_i$ is the intermediate index of refraction, $n_e$ is the extraordinary index of refraction, and $r_0$ is the maximum aperture radius. The F-number of the LCAL can be represented as:

$$F/\# = \frac{r_0}{[4*d*(n_e - n_0)]} \quad (6)$$

In order to have a reasonable F-number, the Fresnel lens phase profile is preferably developed by applying the modulo $n-2\pi$ function.

Figure 3A:
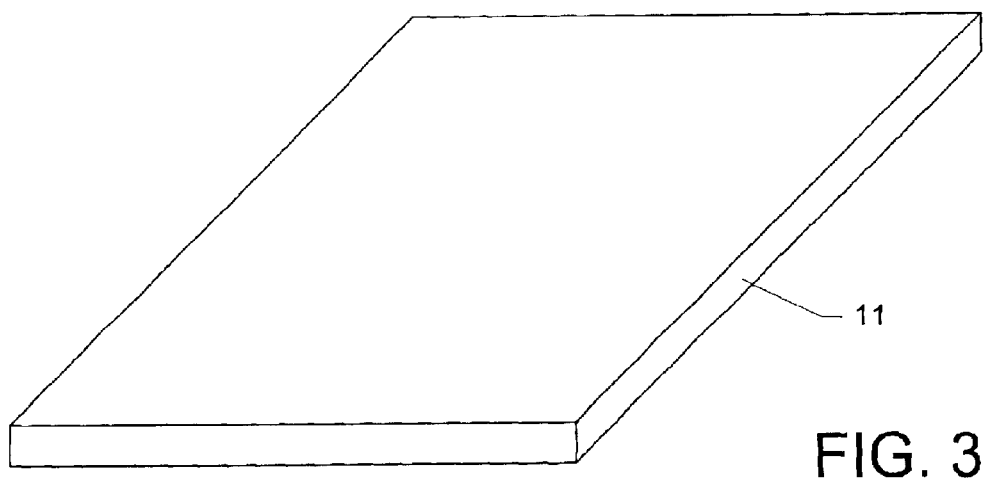
Figure 3B:
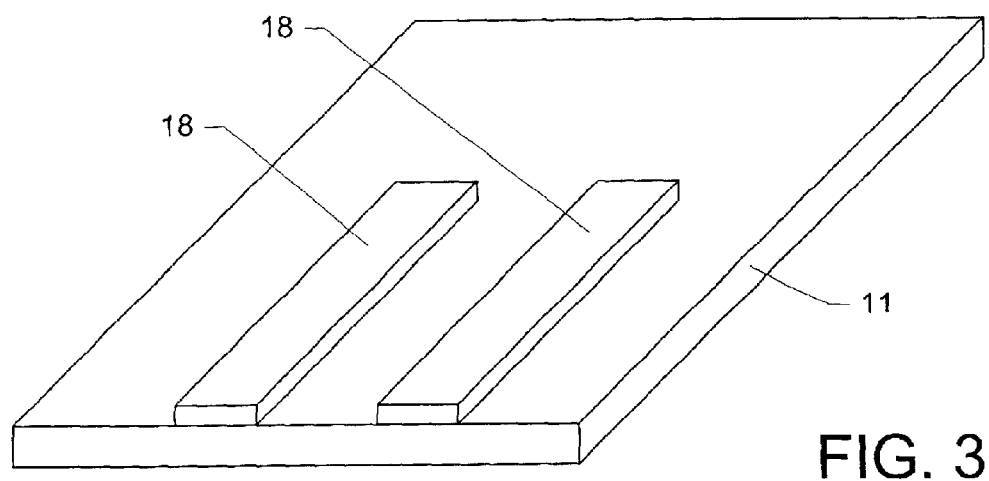
Figure 3C:
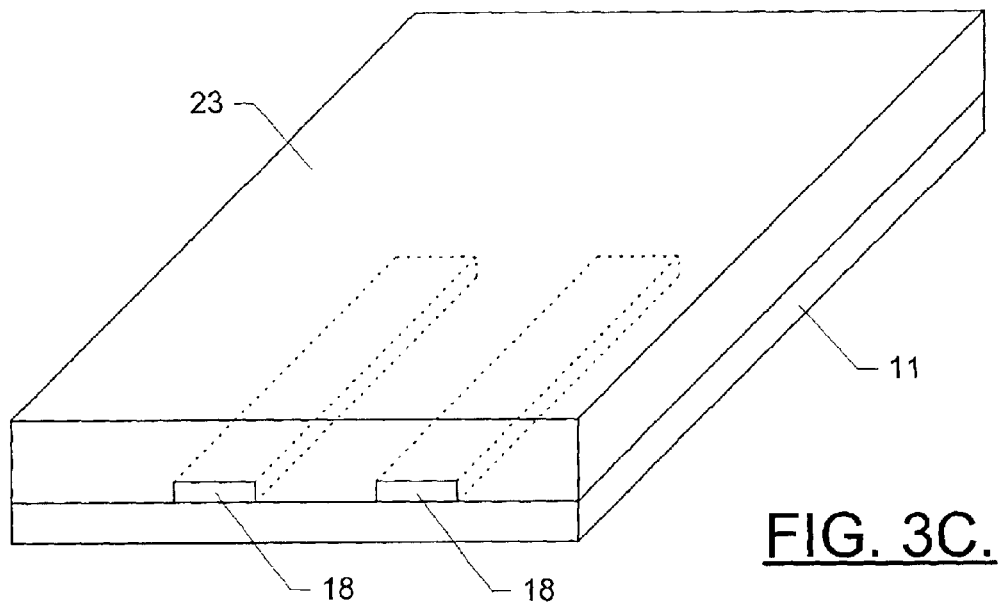
Figure 3D:
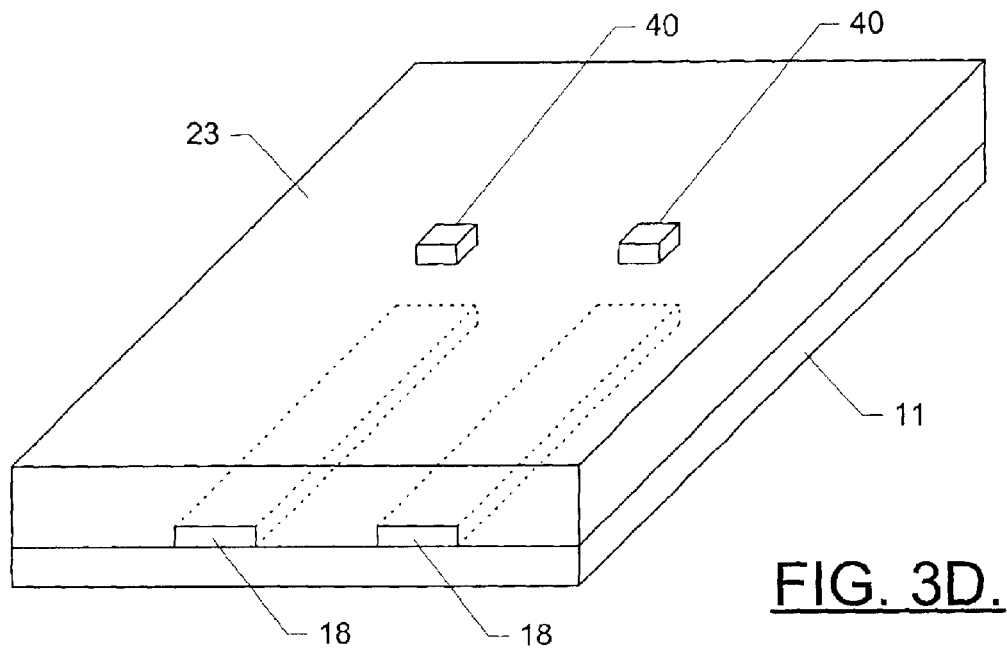
Figure 3E:
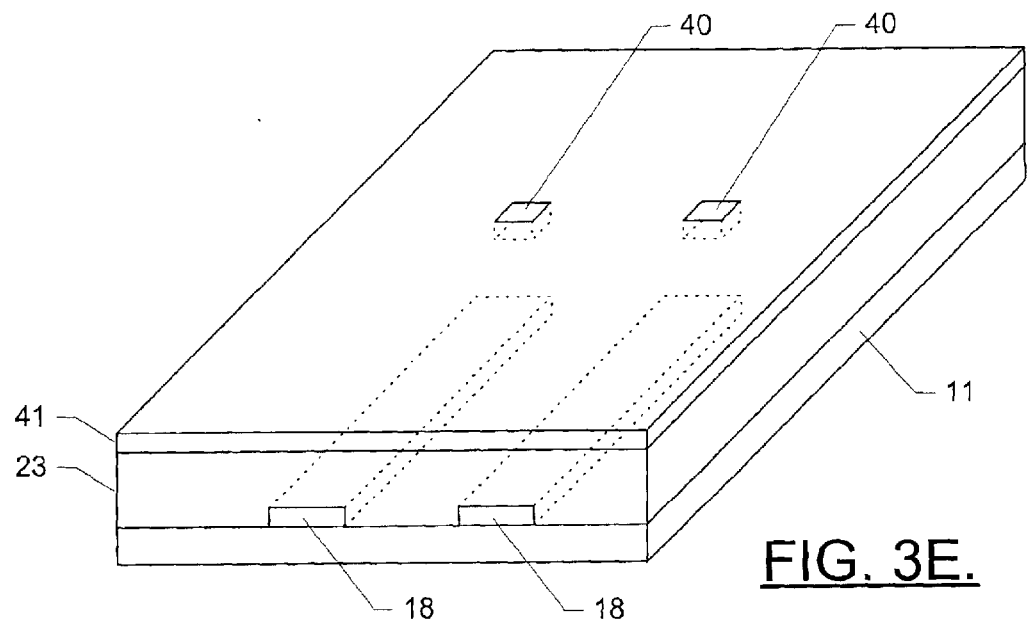

With reference to FIGS. 3A–3J, fabrication of the LCAL 10 begins with providing the substrate layer 11, such as a glass substrate. The conductors 18 are then formed by sputtering and patterning an electrically conductive material, such as indium tin oxide (ITO), on the substrate layer. See FIG. 3B. As previously stated with respect to FIGS. 1 and 2, FIGS. 3B–3J only depict a single Fresnel zone comprising two closed-loop electrodes and two conductors. It should be understood, however, that the Fresnel zones typically comprise a greater number of electrodes and conductors, and the figures are for illustrative purposes only. Next, an insulating layer is deposited on the substrate layer over the conductors. While the insulating layer may be constructed in different manners, the insulating layer of the illustrated embodiment includes a base insulating layer 23 and a planarizing insulating layer 25. In this embodiment, the base insulating layer is deposited on the substrate layer over the conductors, as shown in FIG. 3C. It will be understood by those having skill in the art that a layer, element or component that is described as being "on" or "deposited upon" another layer, element or component may be either deposited directly on the underlying element or may merely overlie the other element with one or more intervening layers or elements being disposed between the elements. The base insulating layer, along with the planarizing insulating layer, formed later, will act to insulate the conductors from the connectors at all locations, except at the vias 24. Typically, the base insulating layer is formed of SU-8.

Figure 3F:
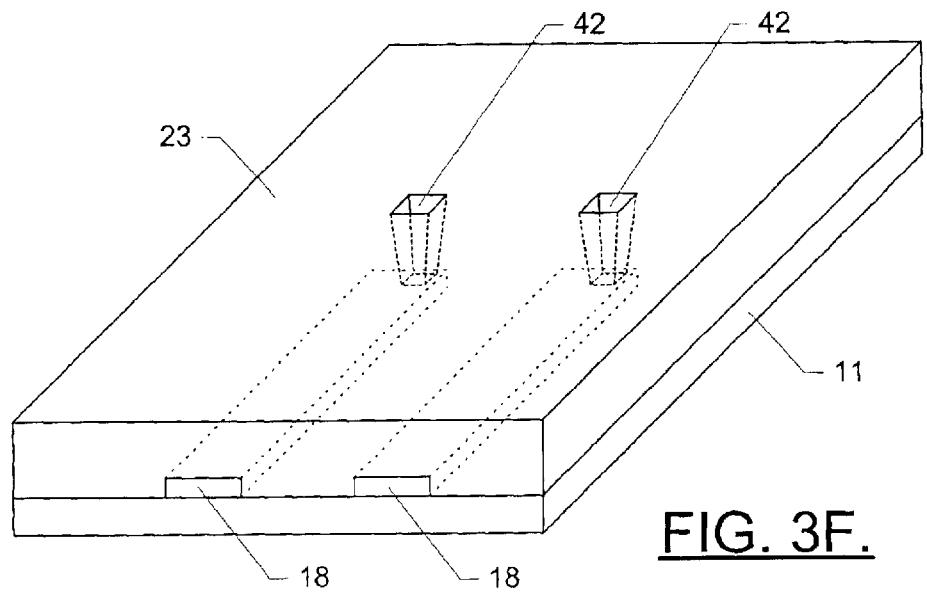
Figure 3G:
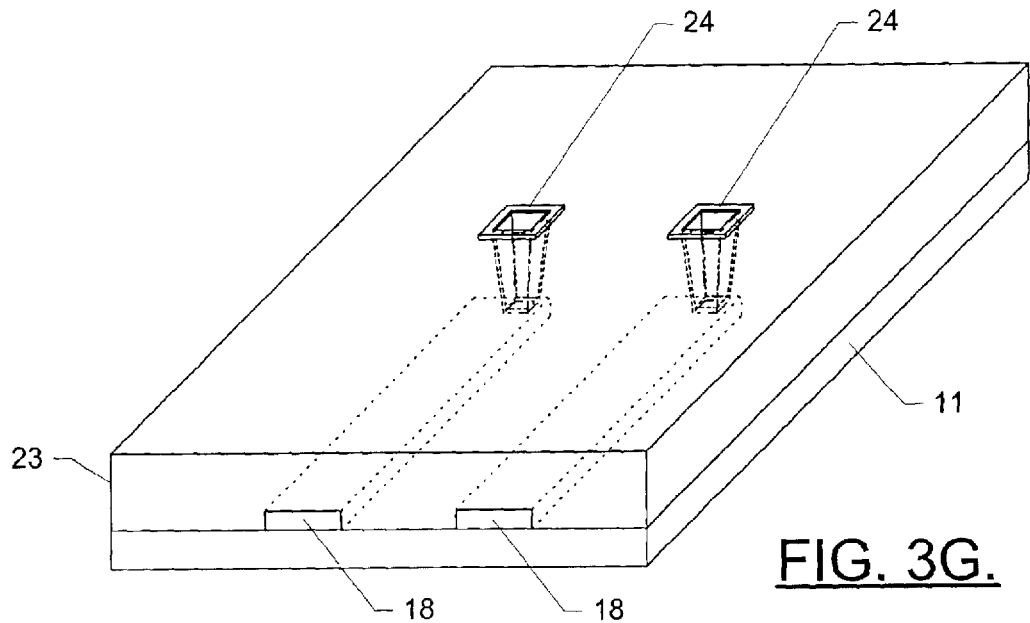
Figure 3H:
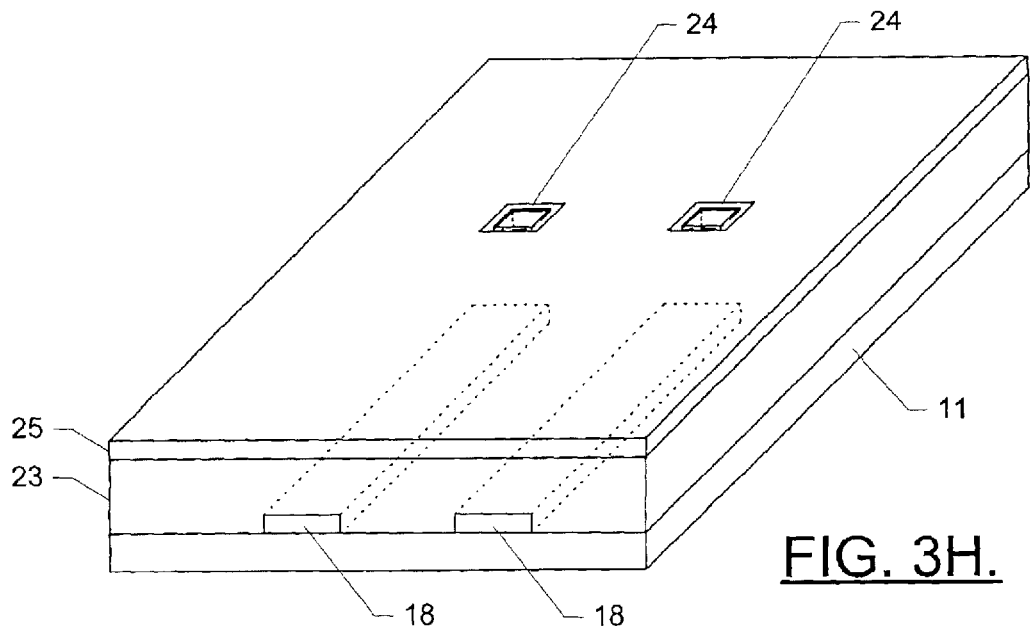

After the base insulating layer 23 is deposited, the closed-loop electrodes are created on the insulating layer. In the illustrated embodiment, at least one closed-loop electrode is in electrical contact with each conductor. However, the LCAL may include more closed-loop electrodes than conductors, if desired. The closed-loop electrodes and the conductors may be electrically connected in various manners. In one preferred embodiment, vias 24 are formed in the base insulating layer by first spinning photoresist 40 on the base insulating layer and then patterning, developing and rinsing the photoresist so the remaining photoresist only covers the locations on the base insulating layer overlying and aligned with the conductors 18 where the vias will be located. See FIG. 3D. A layer of material highly resistant to etching, such as chromium 41, is then sputtered on the base insulating layer around the photoresist, and the photoresist is removed, such as by a lift-off process, to expose the base insulating layer, thus forming an etch mask at the locations where the vias will be located. See FIG. 3E. Next, holes 42 are etched through the base insulating layer at the exposed locations such that at least a portion of the conductors is exposed. The chromium mask is then removed. While the holes can be etched using any number of methods known to those skilled in the art, in one embodiment the holes are etched using a reactive ion etcher. Also, because the holes will be used to form electrically conductive vias, the holes will typically have sloped edges, as shown in FIG. 3F. Next, the vias are formed by depositing an electrically conductive material, such as ITO, along the edges and side walls of the holes so that the conductors can be electrically connected to the electrodes 14 and connectors 20, both formed later. See FIG. 3G.

Figure 3I:
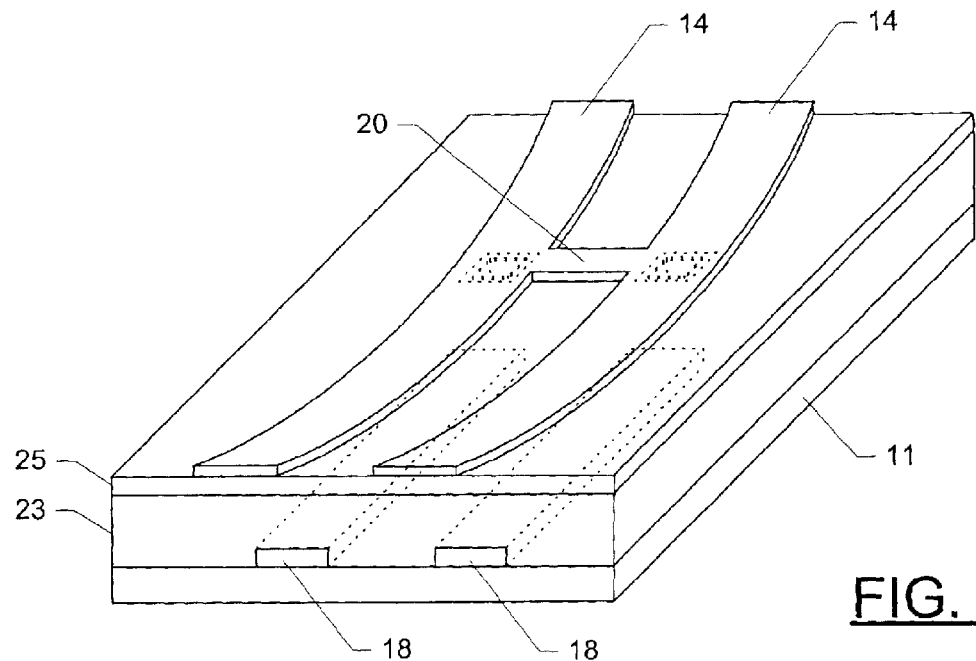

Following the formation of the vias 24, a planarizing insulating layer 25 is preferably formed on the base insulating layer 23 and etched back to expose the conductive material on the edges of the holes 42. See FIG. 3H. Next, the electrodes 14 are created on the planarizing insulating layer. First, an electrically conductive material, such as ITO-coated glass, is deposited on the planarizing insulating layer, such as by sputtering. Then, the electrically conductive material is formed, such as by a lift-off process, into several closed-loop shapes such that each closed-loop shape comprises one closed-loop electrode, as shown in FIG. 3I. Additionally, the electrically conductive material is preferably shaped to form the connectors 20 between the electrodes at the location of the vias, so that each conductor 18 is connected to a respective closed-loop electrode and to the connector by means of a via.

Figure 3J:
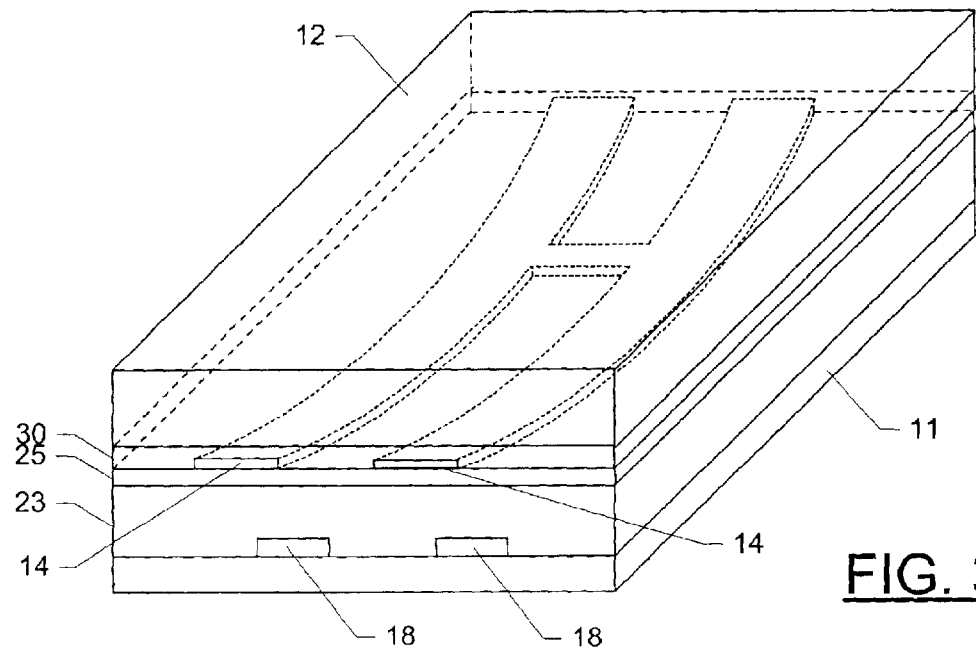

Referring to FIG. 3J, after the electrodes 14 are created, an alignment layer 30 is deposited on the planarizing insulating layer 25, and a layer of nematic liquid crystal 12 is deposited on the alignment layer. Whereas the alignment layer can comprise any of a number of different materials, in one embodiment the alignment layer comprises a polyimide film brushed to set the alignment direction. The thickness of the liquid crystal layer can vary depending upon the desired application. After the liquid crystal layer is deposited on the alignment layer, the reference plate 16 is deposited to the liquid crystal layer, as shown in FIG. 2A.

In operation, a voltage difference is applied across each pair of interconnected conductors 18, thereby adjusting the refractive index of the liquid crystal layer 12 based upon the voltage potential of each closed-loop electrode. In addition, a reference voltage, such as ground, is applied to the reference plate 16 while a voltage differential is applied across each pair of interconnected conductors. Manually driving the LCAL 10 by adjusting it zone by zone generally requires a relatively long time, may not be very accurate and may not be suitable for all real-time application. Therefore, because the liquid crystal 12 reacts to the root-mean-square (RMS) value of the input pulse to the electrodes 14, one aspect of the present invention provides an auto-focusing subsystem to provide an adjustable RMS value of an input pulse to the addressable conductors 18. Referring to FIG. 4, for one Fresnel zone, a set of voltages is input to the two addressable conductors. See block 200. Light, such as an image, is then passed through the LCAL, and thereafter captured at a predefined distance from the LCAL. The image is then analyzed to find the point spread function of the image, as shown in block 210. Because the LCAL is not a perfect optical lens at every voltage input, the image will undergo a certain degree of degradation after passing through the LCAL at the image's capture point, resulting in an image that is somewhat different than the original image. As known to those skilled in the art, the point spread function (PSF) for the LCAL at each voltage will represent the light distribution of a point after passing through the LCAL, with the intensity of the light varying as the image varies around its desired location (with desired focal length of the LCAL). The optimum focal length can be determined by comparing the PSF distributions at the predefined distance from the LCAL for various input voltages to determine the input voltage associated with the image having an intensity that varies the least as the image varies around its desired location.

Next, for each addressable electrode, the voltage is increased through a set of voltages from a start voltage to an end voltage, and the PSF for the image at each voltage is captured. See blocks 210–230. The PSFs are compared to find the optimal PSF for the image which, in turn, corresponds to the desired focal voltage setting for the Fresnel zone, as shown in block 240. In this regard, the optimal PSF can be characterized as the PSF associated with the image having an intensity that varies the least as the image varies around its desired location. The next Fresnel zone is then selected, and the process is repeated. See blocks 250, 260. When the desired focal voltage setting is determined for all Fresnel zones, the desired focal voltage is output to all respective Fresnel zones, and the final image and PSF are recorded, as shown in blocks 270 and 280.

Referring to FIG. 5, an example configuration of the auto-focusing subsystem 100 is illustrated. The auto-focusing system consists of a laser 101, such as a He—Ne laser, that provides the input light, or image, to the system. The input image travels through collimating lens 104 that redirects the image on its route to a mirror 106, which directs the image to the LCAL 10, after the image travels through a polarizer 108, which polarizes the light in a predefined direction. Additionally, the input image can travel through a spatial filter 102 before traveling through the collimating lens. The image then passes through the LCAL and is captured by an image capture device 112, such as a charge injection device (CID) camera, which is set a predefined distance from the LCAL. As the image passes through the LCAL, the controller 116 of a control element 113 provides the input voltage to the addressable electrodes 14 which control the focal length of the LCAL for a respective Fresnel zone. The processing element 114 of the control element then records the input voltage from the controller and calculates the PSF of the image captured by the image capture device. After the PSF is calculated for each voltage in the range of input voltages, the processing element compares the PSF for each voltage. In this regard, the processing element can determine the voltage corresponding with the PSF exhibiting the least amount of spread of light and, thus, the least amount of intensity variation in the image captured. And based upon the comparison of the PSF for each voltage, the processing element determines and records the desired focal voltage for that particular Fresnel zone. Once the processing element has determined the desired focal voltage for each Fresnel zone, the processing element instructs the controller accordingly to produce the final, optimized image.

FIG. 6 illustrates an example arrangement for the controller 116 illustrated in FIG. 5. The controller is designed to be able to generate an AC signal with adjustable RMS value and zero DC offset using a set of digital-to-analog (D/A) converters. The controller is preferably designed for accurate outputs, fast speed and appropriate frequency. The controller includes a microcontroller 122, such as a MC68336 microcontroller, which operates with an oscillator 120, such as a 14.7456 MHz crystal oscillator. The microcontroller receives commands from the computer, typically through a serial interface and level translator 118, which alters the voltage level between the computer and microcontroller. The controller also includes a set of memory devices, such as EPROM 124, flash memory 126 and SRAM 128 for storage of electrode addresses and other data used in the controller. The controller includes address decoders 132 for addressing the addressable electrodes. To send signals to the addressable electrodes, the controller includes a set of data buffers 130 which send the signals to the electrodes through a group of D/A converters 136. In the embodiment including 64 conductors, the controller includes 64 D/A converters.

As such, by including closed-loop electrodes, the LCAL of the present invention can include radial variation in the refractive index of the liquid crystal layer of the LCAL. And due to the radial variation in the refractive index, the LCAL is capable of focusing linearly polarized light with just one cell, with a single controller driving the cell with one control voltage, as opposed to conventional lenses, which require multiple cells driven with multiple voltages.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A liquid crystal adaptive lens (LCAL) comprising:

a reference plate;

a liquid crystal layer disposed in electrical communication with said reference plate;

a plurality of closed-loop electrodes disposed in electrical communication with said liquid crystal layer, said plurality of closed-loop electrodes adapted to receive a variable control voltage such that a refractive index of at least a portion of said liquid crystal layer is adjustable such that light passing through said liquid crystal layer is capable of being redirected;

at least one pair of conductors in electrical contact with at least two closed-loop electrodes; and at least one connector electrically connecting at least two closed-loop electrodes and each conductor of a respective pair of conductors, wherein said at least one pair of conductors and said at least one connector are capable of providing the variable control voltage to said plurality of closed-loop electrodes.

2. An LCAL according to claim 1, wherein said plurality of closed-loop electrodes are disposed in a concentric circular pattern such that said plurality of closed-loop electrodes are capable of providing radial variation in the refractive index across at least a portion of said liquid crystal layer.

3. An LCAL according to claim 1, wherein said plurality of closed-loop electrodes are evenly spaced from one another such that a voltage drop between each adjacent closed-loop electrode is equal when the variable control voltage is applied across the at least one pair of conductors.

4. An LCAL according to claim 3, wherein the at least one pair of conductors has a resistivity less than a resistivity of a respective connector.

5. An LCAL according to claim 3, wherein said plurality of closed-loop electrodes comprise at least one subset of closed-loop electrodes, wherein each pair of conductors are in electrical contact with a respective subset of closed-loop electrodes, and wherein each connector electrically connects each closed-loop electrode of a respective subset of closed-loop electrodes and each conductor of the respective pair of conductors.

6. An LCAL according to claim 5, wherein the LCAL is capable of emulating a Fresnel phase profile with each subset of closed-loop electrodes comprising a Fresnel zone.

7. An LCAL according to claim 6, wherein a phase delay in each Fresnel zone is equal.

8. A method of fabricating a liquid crystal adaptive lens comprising:

forming at least one pair of conductors upon a substrate;

depositing an insulating layer upon the at least one pair of conductors and the substrate;

creating a plurality of closed-loop electrodes on the insulating layer such that at least one closed-loop electrode is in electrical contact each conductor of the at least one pair of conductors, wherein creating the plurality of closed-loop electrodes further comprises forming al least one connector between at least two closed-loop electrodes;

depositing a layer of liquid crystal upon the plurality of closed-loop electrodes; and depositing a reference plate upon the layer of liquid crystal.

9. A method according to claim 8, wherein creating a plurality of closed-loop electrodes comprises:

forming at least one pair of electrically conductive vias within the insulating layer such that the vias are in electrical contact with a respective pair of conductors; and producing the plurality of closed-loop electrodes such that at least one closed-loop electrode electrically contacts each via.

10. A method according to claim 9, wherein forming the at least one pair of electrically conductive vias comprises:

forming an etch mask defining at least one opening upon the insulating layer;

etching at least one hole within the at least one opening, wherein the at least one hole extends through the insulating layer such that at least a portion of the at least one pair of conductors is exposed; and depositing an electrically conductive material within the at least one hole such that the electrically conductive material electrically contacts the at least one pair of conductors.

11. A method according to claim 8, wherein creating the plurality of closed-loop electrodes comprises depositing a layer of electrically conductive material upon the insulating layer and thereafter forming the layer of electrically conductive material into the plurality of closed-loop electrodes.

12. A method according to claim 8, wherein creating the plurality of closed-loop electrodes comprises creating the plurality of closed-loop electrodes in a concentric circular pattern.

13. A liquid crystal adaptive lens (LCAL) system comprising:

an LCAL including a reference plate, a liquid crystal layer disposed in electrical communication with the reference plate, a plurality of close-loop electrode disposed in electrical communication with the liquid crystal layer, and at least one pair of conductors connected by at least one connector and in electrical contact with at least two closed-loop electrodes, wherein the plurality of closed-loop electrodes are adapted to receive, via the at least one connector, a variable control voltage such that a refractive index of at least a portion of said liquid crystal layer is adjustable such that light passing through the liquid crystal layer is capable of being redirected; and an auto-focusing subsystem capable of applying the variable control voltage to the conductors of said LCAL, wherein the auto-focusing subsystem is capable of adjusting the variable control voltage to said LCAL to thereby adjust a refractive index of at least a portion of the liquid crystal layer of said LCAL such that light passing through the liquid crystal layer is capable of being redirected.

14. An LCAL system according to claim 13, wherein said auto-focusing subsystem comprises:

an image source capable of passing light through said LCAL;

an image capture device capable of capturing the light after the light passes through the liquid crystal layer of said LCAL; and a control element capable of adjusting the variable control voltage to at least one subset of the plurality of closed-loop electrodes of said LCAL to thereby adjust the refractive index of at least a portion of the liquid crystal layer of said LCAL, wherein said control element is capable of adjusting the variable control voltage at least partially based upon a point spread function of the light captured by said image capture device.

15. An LCAL system according to claim 14 further comprising:

a lens capable of directing the light in a predetermined direction before the light passes through said LCAL; and a polarizer capable of polarizing the light in a predefined orientation after said lens directs the light and before the light passes through said LCAL.

16. An LCAL system according to claim 15, wherein said control element is capable of applying a set of control voltages to said LCAL and calculating the point spread function for the light captured by said image capture device at each control voltage, and wherein said control element is capable of adjusting the variable control voltage based on a comparison of the point spread function for the light captured at each control voltage in the set.

17. An LCAL system according to claim 16, wherein the plurality of closed-loop electrodes comprise at least one subset of closed-loop electrodes, wherein said control element is capable of applying a set of control voltages to each subset of closed-loop electrodes and thereafter calculating the point spread function for the light captured by said image capture device at each voltage within each set of voltages applied to each subset of closed-loop electrodes, wherein said control element is capable of comparing the point spread function for the light captured at each voltage, and wherein said control element is capable of adjusting the variable control voltage to the plurality of closed-loop electrodes based upon the comparison of the point spread function for the light captured at each control voltage in each set of voltages applied to each subset of closed-loop electrodes.

18. A method of focusing a liquid crystal adaptive lens (LCAL) comprising:

providing an LCAL including a reference plate, a liquid crystal layer disposed in electrical communication with the reference plate, a plurality of closed-loop electrodes disposed in electrical communication with the liquid crystal layer, and at least one pair of conductors connected by at least one connector and in electrical contact with at least two closed-loop electrodes:

applying a variable control voltage to a subset of the plurality of closed-loop electrodes of said LCAL via the at least one pair of conductors;

passing light through the liquid crystal layer of the LCAL;

capturing the light after the light passes through the liquid crystal layer of the LCAL;

calculating a point spread function for the light captured; and adjusting the variable control voltage at least partially based upon the point spread function to thereby adjust a refractive index of at least a portion of the liquid crystal layer such that the light passing through the liquid crystal layer is redirected.

19. A method according to claim 18 further comprising:

directing the light in a predetermined direction before passing the light through the LCAL; and polarizing the light in a predefined orientation after directing the light.

20. A method according to claim 18, wherein applying the variable control voltage comprises applying a series of control voltages, wherein capturing the light comprises capturing the light after the light passes through the LCAL at each control voltage, and wherein calculating the point spread function comprises calculating the point spread function for the light captured at each control voltage, said method further comprising:

comparing the point spread function for the light captured at each control voltage before adjusting the variable control voltage, wherein adjusting the variable control voltage is based upon the comparison.

21. A method according to claim 20, wherein passing and capturing the light, and calculating and comparing the point spread function repeatedly occur for each subset of the plurality of closed-loop electrodes before adjusting the variable control voltage.

* * * * *

UNITED STATES PATENT AND TRADEMARK OFFICE
CERTIFICATE OF CORRECTION

| | |
|---|---|
| PATENT NO. | : 6,778,246 B2 |
| APPLICATION NO. | : 10/053940 |
| DATED | : August 17, 2004 |
| INVENTOR(S) | : Sun et al. |

It is certified that error appears in the above-identified patent and that said Letters Patent is hereby corrected as shown below:

<u>Column 13,</u>

Line 37, "claim 15" should read --claim 13--.

Signed and Sealed this

Twenty-fourth Day of April, 2007

JON W. DUDAS
*Director of the United States Patent and Trademark Office*